United States Patent [19]

Tung et al.

[11] 4,169,115

[45] Sep. 25, 1979

[54] PREPARATION OF BLOCK COPOLYMERS AND PRODUCTS THEREFROM

[75] Inventors: Lu H. Tung; Grace Y. Lo; Billy E. Burgert, all of Midland, Mich.

[73] Assignee: The Dow Chemical Company, Midland, Mich.

[21] Appl. No.: 908,478

[22] Filed: May 22, 1978

Related U.S. Application Data

[63] Continuation of Ser. No. 782,814, Mar. 30, 1977, abandoned.

[51] Int. Cl.$^2$ .............................................. C08F 295/00
[52] U.S. Cl. .................................... 525/314; 525/271; 525/348; 525/354

[58] Field of Search ................ 260/880 B, 878 B, 879, 260/881; 526/293

[56] References Cited

U.S. PATENT DOCUMENTS

| | | | |
|---|---|---|---|
| 3,108,994 | 10/1963 | Zelinski | 260/93.5 |
| 3,265,765 | 8/1966 | Holden | 260/880 B |

*Primary Examiner*—Paul R. Michl

[57] ABSTRACT

Block copolymers of AB or ABA configuration are prepared by anionically polymerizing one component, terminating the living polymer with sulfur or an episulfide and completing polymerization of the remaining block portion by free-radical polymerization.

5 Claims, No Drawings

PREPARATION OF BLOCK COPOLYMERS AND PRODUCTS THEREFROM

This is a continuation, of application Ser. No. 782,814 filed Mar. 30, 1977, now abandoned.

A wide variety of block copolymers are prepared anionically, for example, by the polymerization in the presence of lithium-containing compounds wherein one segment of the polymer chain is polymerized. When polymerization of the one monomer component is complete, a second monomer component is added and on occasion a third monomer. Such polyanions can be terminated by a single proton donating compound or coupled by a variety of halogen containing agents such as silicon chlorides to provide block copolymers. Polyfunctional initiators having two, three or more polymerization initiating sites such as a polylithium compound can be employed to prepare a variety of block copolymer structures. Many of such polymers are useful for a variety of purposes including molding, extrusion, adhesives, rubbery so-called thermoplastic elastomers and rubbers suitable for the reinforcement of polymers such as polystyrene. Anionic polymerization is limited, however, by the monomers that can be employed. Many halogen containing monomers cannot be satisfactorily polymerized by anionic methods because of the side reactions involved and are unsuitable for block copolymer formation. Similarly some polar monomers such as methyl methacrylate and acrylonitrile, require polymerization under anionic conditions at extremely low temperature are not, from a practical standpoint suitable for polymerization into block copolymers. Suitable monomers for anionic block preparation include: α-methylstyrene, p-methoxy-α-methylstyrene, p-methyl-α-methylstyrene, styrene, p-methylstyrene, 2,4-dimethylstyrene, m-ethylstyrene, m-isopropenylstyrene, or butadiene, isoprene, piperylene, ethylene sulfide, propylene sulfide, ethylene oxide, propylene oxide and the like. Thus, employing known techniques for block polymer preparations using an anionic polymerization process effectively excludes a wide variety of monomers and the benefits they provide when incorporated in a block copolymer.

It would be advantageous if there were available an improved process for the preparation of block copolymers.

It would also be desirable if there were available an improved process for the preparation of block copolymers which would permit the inclusion of monomers which are generally considered unsuitable for anionic polymerization.

It would also be desirable if there were available block copolymers incorporating monomers generally considered unsuited for anionic polymerization.

These benefits and other advantages in accordance with the present invention are achieved in a method for the preparation of a block copolymer, the steps of the method comprising providing an anionically polymerizable monomer or mixtures thereof, polymerizing the monomer or mixtures thereof anionically to provide polymer chains having at least one active or living end, contacting said polymer chains with a sulfur compound in a quantity at least sufficient to react with said polymer chain living ends, to thereby terminate the ends with a primary or secondary thiol group, contacting the thiol terminated polymer chains with a free-radical polymerizable monomer and initiating free-radical polymerization to thereby provide a block copolymer comprising at least one anionically polymerized block and at least one free-radical initiated block.

Also contemplated within the scope of the present invention are block copolymers prepared in accordance with the method of the invention.

Monomers which are polymerizable by free radical initiation suitable for the practice of the present invention include: α-methylstyrene, p-methoxy-α-methylstyrene, p-methyl-α-methylstyrene, styrene, p-methylstyrene, p-chlorostyrene, 2,4-dimethylstyrene, m-ethylstyrene, m-isopropenylstyrene, or butadiene, isoprene, piperylene, or methyl, ethyl, propyl, isopropyl, butyl, isobutyl, sec-butyl, tert-butyl, amyl, 2-ethylhexyl, octyl, capryl, nonyl, 3,5,5-trimethylhexyl, dodecyl, hexadecyl, octadecyl, cyclohexyl, methylcyclohexyl, trimethylcyclohexyl, phenyl, methallyl, crotyl, butenyl, undecenyl, oleyl, methoxyethyl, ethylthioethyl, butoxyethyl, ethoxyethoxyethyl, phenoxyethyl, benzoethyl, cyclohexoxyethyl, butoxypropyl, ethoxybutyl, terphenyl, phenylethyl, hexahydrobenzyl, tetrahydrobenzyl, tetrahydrofurfuryl, dicyclopentyl, dicyclopentenyl, methacrylate or acrylate, or 2-, 3-, or 4-vinylpyridine, or acrylonitrile, methacrylonitrile, α-phenylacrylonitrile, or dimethyl methylenemalonate, diethyl methylenemalonate, vinylidene cyanide, or methyl, ethyl, or butyl α-cyanoacrylate.

By the term "sulfur-compound" is meant elemental sulfur and alkyl episulfides, the episulfides being of the formula:

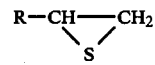

wherein R is hydrogen, lower alkyl (1–18 carbon atoms) and aromatic group contains only hydrogen and carbon. Such compounds include: ethylene sulfide, propylene episulfide, dodecylene episulfide, phenyl episulfide and the like.

Solvents can be employed for the anionic polymerization in accordance with the present invention. Suitable solvents include: benzene, toluene, xylene, ethylbenzene, and the like. Also useful are ethers such as diethyl ether, diisopropyl ether, dioxane, tetrahydrofuran and the dimethyl ether of ethylene glycol. In selecting the solvent they should be, in general, for the polymer formed and they should be generally non-reactive under conditions employed for polymerization and not have an undesired tendency to act as chain-terminating or transfer agents. A wide variety of catalysts or polymerization initiators may be employed for the anionic polymerization in accordance with the present invention and beneficially include organolithium compounds.

The organolithium compounds used correspond to the formula $R(Li)_x$, wherein R is a hydrocarbon radical selected from the group consisting of aliphatic, cycloaliphatic and aromatic radicals and x is an integer from 1 to 4, inclusive. The aliphatic and cycloaliphatic radicals can be saturated or contain olefinic unsaturation. The R in the formula has a valence equal to the integer, and preferably contains from 1 to 20 inclusive, carbon atoms, although it is within the scope of the invention to use higher molecular weight compounds. Examples of these compounds include: methyllithium, isopropyllithium, n-butyllithium, tert-octyllithium, n-decyllithium, phenyllithium, naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butene, 1,8-dilithio-3-decene, 1,4-dilithiobenzene, 1,4-dilithionaphthalene, 1,2-dilithio-1,3-diphenylethane, 9,10-dilithio-9,10-dihydroanthracene, 1,2-dilithio-1,8-diphenyloctane, 1,3,5-trilithiopentane, 1,5,15-trilithioeicosane, 1,3,5-trilithiocyclohexane, 1,2,5-trilithioanphthalene, 1,3,5-trilithioanthracene, 1,3,5,8-tetralithiodecane, 1,5,10,20-tetralithioeicosane, 1,2,4,6-tetralithiocyclohexane, 1,2,3,5-tetralithio-4-hexylanthracene, 1,3-dilithio-4-cyclohexene, and the like.

Another desirable variety of lithium initiators are the difunctional lithium compounds suitable for the preparation of block copolymers of the ABA configuration. Such initiators are prepared by the addition of two moles of an alkyl lithium such as butyl lithium to one mole of an aromatic diethenyl compound such as:

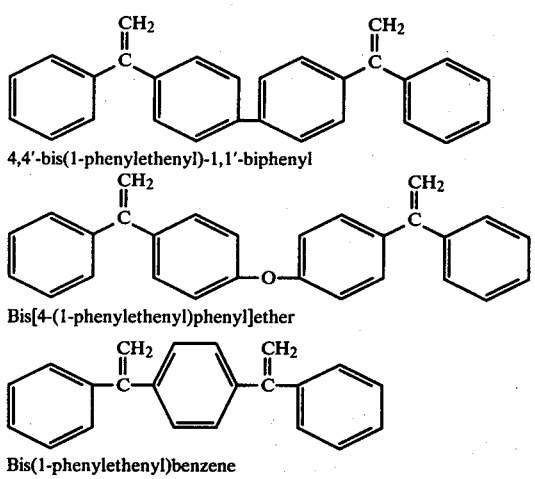

4,4'-bis(1-phenylethenyl)-1,1'-biphenyl I.

Bis[4-(1-phenylethenyl)phenyl]ether II.

Bis(1-phenylethenyl)benzene III.

to provide the corresponding dilithium compounds which are:

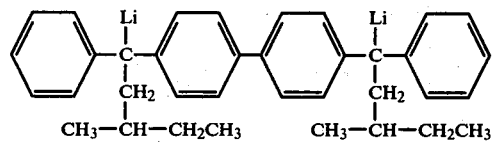

(1,1'-biphenyl)-4,4'diylbis(3-methyl-1-phenylpentylidene)-bis(lithium)
I Li

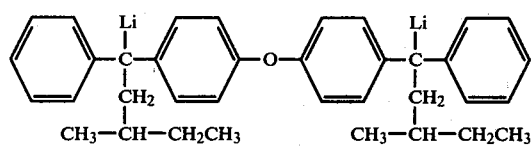

oxydi-4,1-phenylenebis(3-methyl-1-phenylpentylidene)-bis(lithium)
II Li

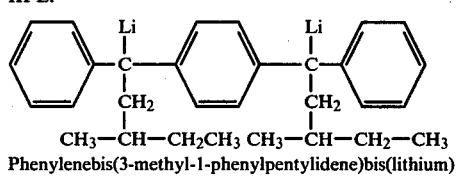

Phenylenebis(3-methyl-1-phenylpentylidene)bis(lithium)
III Li

The dilithium compounds are readily solubilized by the addition of from about twenty to one-hundred moles of butadiene or isoprene at about 60° centigrade in a nonreactive solvent such as benzene.

Lithium compounds are used with particular benefit, however, other alkali metal anionic polymerization initiating systems may be used with benefit, such as those described in U.S. Pat. Nos. 3,410,836; 3,448,020; 3,458,491; 3,530,105; 3,534,012; 3,684,741; 3,734,970; 3,751,403 the teachings of which are herewith incorporated by reference thereto.

The amount of catalyst or initiator used in the preparation of block copolymers by anionic polymerization can vary over a wide range but will generally be at least 0.00001 mole of the organolithium compound per 100 moles of the total monomers to be polymerized in the process. The upper limit for the amount of organolithium used depends primarily upon catalyst solubility and the desired molecular weight of the polymer resulting from the polymerization. A preferred effective catalyst level is from about 0.005 to about 1 mole of organolithium per 100 moles of total monomers charged to the polymerization zone.

In the free-radical polymerization in accordance with the invention, many free-radical polymerization initiating compounds may be employed or alternatively free radicals may be generated by heating in the absence of a peroxide compound or other free-radical generating compound.

The free-radical generating compounds which can be employed in this invention include organic, inorganic peroxides and azo compounds. The term "organic peroxides" is meant to include the hydroperoxides, unless otherwise stated, and to encompass compounds containing from 4 to 40 carbon atoms per molecule, inclusive.

Examples of suitable peroxides include: methyl n-propyl peroxide, diethyl peroxide, ethyl isopropyl peroxide, di-tert-butyl peroxide, di-n-hexyl peroxide, n-hexyl n-decyl peroxide, dieicosyl peroxide, dicyclohexyl peroxide, dicyclopentyl peroxide, bis(2,4,6-trimethylcyclohexyl) peroxide, bis(3,5-dichlorocyclohexyl) peroxide, bis(4-phenylcyclohexyl) peroxide, bis(2-cyclohexenyl) peroxide, bis(4-methyl-2-hexenyl) peroxide, bis(4-octenyl) peroxide, dipropionyl peroxide, dilauroyl peroxide, dibenzoyl peroxide, dicrotonyl peroxide, dibenzyl peroxide, dicumyl peroxide, methyl 2-n-propyl-3-butenyl peroxide, bis(alpha-ethylbenzyl) peroxide, bis[-diisopropyl-(4-isopropylphenyl)methyl]peroxide, bis[-dimethyl-(4-tert-butyl)phenylmethyl]peroxide, benzyl alpha-methylbenzyl peroxide, bis[(4-chlorobenzoyl)-]peroxide, bis(2,4-dichlorobenzoly) peroxide, bis(2-propoxy-n-hexyl) peroxide, n-pentyl 5,8-diphenyldodecyl peroxide, bis(9,10-dihydroxydecyl) peroxide, 2,5-di(tert-butylperoxy)-2,5-dimethylhexane, bis(2-hydroxyheptyl) peroxide, tert-butyl hydroperoxide, dodecyl hydroperoxide, eicosyl hydroperoxide, triacontanyl hydroperoxide, 4-methylcyclohexyl hydroperoxide, phenylcyclohexane hydroperoxide, 3-cyclohexenyl hydroperoxide, 3-phenyl-2-cyclohexenyl hydroperoxide, 4-cyclopentyl-n-butyl hydroperoxide, cumene hydroperoxide (dimethylphenylhydroperoxymethane), dissopropylbenzene hydroperoxide[dimethyl-(4-isopropylphenyl) hydroperoxymethane], (4-ethoxyphenyl) methyl hydroperoxide, di-n-hexyl-4-hydroxyphenylhydroperoxymethane, dimethyl(3-methoxyphenyl) hydroperoxymethane, peroxybenzoic acid, peroxybutyric acid, peroxydodecanoic acid, tert-butyl peroxybenzoate, di-tert-amyl diperoxyphthalate, tert-docecyl peroxyacetate. Peroxides formed by the oxidation of terpene hydrocarbons such as pinane, alpha-pinene, p-methane, and turpentine can also be used.

The organic peroxides can also be substituted with non-peroxy members such as halogen, hydroxy radicals, ether and/or ester linkages, and the like.

Azo compounds suitable for use in the practice of the invention include: azobisisobutyronitrile, 2,2'-axobis-(2,4-dimethylvaleronitrile), 2(t-butylazo)isobutyronitrile, 2-t-butylazo-2-cyanobutane, 1-(t-butylazo)-1-phenylcyclohexane, 1-t-amylazo-1-cyanocyclohexane, etc.

The free-radical polymerization in accordance with the invention may be carried out in solution suspension, bulk or emulsion techniques. A wide variety of block copolymers may be readily prepared by the process of the present invention. Such polymers may have homopolymer blocks, copolymer blocks or a mixed block copolymer wherein one of the blocks may be a homopolymer and one or more of the blocks being copolymer.

Particularly desirable block copolymers in accordance with the present invention are an ABA copolymer of butadiene and a random copolymer of styrene and acrylonitrile. By the term "random copolymer" is meant one wherein the sequence of styrene and acrylonitrile does not have a precise mathematical relationship. Beneficially, the block B is a homopolymer of butadiene or isoprene having a molecular weight of 30,000 to 500,000 and beneficially 40,000 to 80,000, the A block containing 95 to 50 parts by weight styrene and 5 to 50 parts by weight of acrylonitrile, the A block having a weight average molecular weight of from 3,000 to 100,000 and preferably 5,000 to 20,000 molecular weight units, molecular weights being determined by gel permeation chromatography. Another desirable block copolymer of the ABA configuration is a block copolymer of butadiene or isoprene with bromostyrene wherein the block B has the hereinbefore delineated molecular weight limitations and block A is a bromostyrene block having a weight average molecular weight of 5,000 to 200,000 and beneficially from 10,000 to 50,000 molecular weight units, the molecular weight being determined in the same manner as that of the hereinbefore specified styrene-acrylonitrile blocks. Polymers prepared in accordance with the present invention beneficially can be employed for a variety of applications by selection of the desired blocks. Thermoplastic elastomers are readily prepared as well as thermoplastics, polymeric surface active agents, emulsifiers, vulcanizable elastomers, and the like. Thermoplastic elastomers, thermoplastics and rubbers prepared in accordance with the present invention are readily fabricated by conventional fabricating techniques such as solvent casting, compression molding, injection molding, extrusion, melt spinning and like fabrication techniques to provide a wide variety of useful articles including fibers, films, compression molding, injection moldings, and the like. Block polymers in accordance with the present invention may be compounded with pigment, fillers, stabilizers, dyes and the like in conventional plastic or elastomer processing procedures.

The invention is further illustrated, but is not limited by the following examples.

EXAMPLE 1

An agitated, nitrogen-purged flask was charged with 50 grams of butadiene dissolved in 450 milliliters of dry benzene. 14.3 Milliequivalents of n-butyllithium in benzene was added and the temperature of the reaction mixture maintained by means of a water bath at a temperature of from about 50° to 55° C. Polymerization was completed in about thirty minutes. A 20 milliliter portion of the reaction mixture was withdrawn from the vessel by a syringe and injected into a 100 milliliter nitrogen-purged flask which contained 0.15 milliliter of tetrahydrofuran. The mixture of polybutadiene solution and tetrahydrofuran was cooled to about 5° C. and 0.16 milliliter of propylene sulfide added. The resulting mixture was stirred for about 12 minutes and 0.1 milliliter of glacial acetic acid was added to the mixture and the mixture diluted with about 60 milliliters of methanol. On addition of methanol, a precipitate formed. The precipitate was separated by filtration and dried overnight at room temperature under vacuum. The product was 2 grams of polybutadiene with a mercaptan cap or end group. A second 20 milliliter portion of the reaction mixture was similarly treated with the exception that 0.13 milliliter of ethylene sulfide was employed in place of propylene sulfide to provide an ethylene sulfide terminated polybutadiene weighing about 2 grams. A 1/10 gram portion of the propylene sulfide terminated polybutadiene was mixed with 10 milliliters of styrene monomer and 5 milliliters of ethylbenzene. The mixture was divided into two portions and each portion was placed in a glass ampoule. Both ampoules were heated to 125° C., one ampoule for a period of one hour and the remaining ampoule for three hours. At the end of that time, the ampoules were cooled, the contents removed and analyzed by gel permeation chromatography. The weight of the polymer sample recovered showed that at the end of one hour heating, 7.5 weight percent of the styrene polymerized and the sample heated for three hours resulted in 22.5 weight percent polymerized styrene. Gel permeation chromatography chromatograms indicated the presence of some mercaptan capped polybutadiene in the sample which had been heated for one hour. No indication of the mercaptan capped polybutadiene was present in the sample which had been heated for three hours. Similar results were obtained with the ethylene sulfide terminated polybutadiene. A portion of the polybutadiene solution which was uncapped was terminated with glacial acetic acid and subsequently subjected to the same polymerizing condition, that is, 125° C. for one hour and for three hours in the presence of styrene and on examination using gel permeation chromatography, the peak corresponding to the polybutadiene appeared generally unchanged. The foregoing demonstrate clearly that the sulfide-terminated polymers exhibit a strong tendency to form block copolymers. The block copolymers prepared were of the AB configuration.

EXAMPLE 2

A quantity of bis[4-(1-phenylethenyl)phenyl]ether (0.4 gram) in 30 milliliters of dry benzene was mixed with 2.36 milliequivalents of secondary butyl lithium at room temperature for a period of three hours to form oxydi-4,1-phenylene bis(3-methyl-1-phenylpentylidene)-bis(lithium). To the reaction vessel was added two milliliters of isoprene, and the reaction mixture heated for about 5 minutes at 60° C., thereby solubilizing the suspension of the bislithium compound. The resulting solution was then charged to a one-liter nitrogen purged flask which contained 40 grams of butadiene dissolved in 450 milliliters of dry benzene. A water bath having a temperature between about 50° and 55° C.

was employed to maintain the temperature of the reaction mixture. Polymerization of the butadiene proceeded for about 55 minutes and the reaction vessel and mixture cooled in an ice bath. A solution of one-half milliliter of propylene sulfide and two milliliters of tetrahydrofuran were added to the vessel with agitation. The viscosity of the reaction mixture appeared to decrease somewhat and then increase rapidly. Fifteen minutes after the addition of the propylene sulfide, one milliliter of glacial acetic acid was added to terminate any active anions. The yield of the dimercaptan capped polybutadiene was quantitative. The capped polybutadiene had an inherent viscosity of 0.79 deciliter per gram when measured in toluene at 0.15 gram of polymer per one-hundred milliliters of toluene at a temperature of 25° C. An eight gram portion of the dimercaptan capped polybutadiene was mixed with twelve grams of styrene and 37 grams of ethylbenzene. The resultant mixture was heated at 130° C. for 41 hours in a nitrogen purged closed stainless steel tube. A viscous reaction mass resulted which was then diluted with benzene and methanol to precipitate the resultant block copolymer of ABA configuration. The resultant polymer was analyzed by gel permeation chromatography using both an ultraviolet detector and a refractive index detector. The over-all styrene content of the block copolymer was determined to be 50.6 percent. The molecular weight and styrene content of the material corresponding to the main gel permeation peak was 80,000 and 34 percent, respectively. The gel permeation chromatography chromatogram also indicated some of the polymer chains underwent a coupling reaction to form high molecular weight branched structures and some styrene homopolymers. The product was soluble in benzene, methylenechloride and tetrahydrofuran. On molding of the portions of the polymer, an elastic solid sheet was obtained which had a tensile strength of 1500 pounds per square inch at break and elongation at break was 700 percent which within experimental error compares to 1560 pounds per square inch and 660 percent elongation reported for styrene butadiene block copolymer reported by Holden and Milkovich in U.S. Pat. No. 3,265,765 wherein the polymer was prepared by a conventional anionic polymerization technique.

EXAMPLE 3

An eight gram portion of the propylene sulfide capped polybutadiene prepared in Example 2 was mixed with six grams of styrene, two grams of acrylonitrile, 37 grams of ethylbenzene and 400 milligrams of azobisisobutylnitrile. The resulting mixture was placed in a nitrogen purged, closed, stainless steel tube and heated to 70° C. and maintained at that temperature for a period of four hours. The polymer was recovered by dissolving reaction mixture in benzene and precipitation in methanol. A portion of the product was compression-molded. A molded sample was a thermoplastic elastomer having a tensile strength at rupture of 1490 pounds per square inch and elongation at break of 400 percent. The end blocks of this polymer are styrene-acrylonitrile random copolymer as compared to polystyrene homopolymer of Example 2.

EXAMPLE 4

The procedure of Example 3 was repeated using the propylene sulfide capped polybutadiene prepared in Example 2 employing eight grams of the capped polybutadiene with 21 grams of bromostyrene, 0.2 gram of azobisisobutyrolnitrile and 37 grams ethylbenzene. The mixture was polymerized at 70° for six hours. Upon molding of the resultant thermoplastic elastomeric polymer, the tensile strength at rupture was 1620 pounds per square inch with an ultimate elongation of 520 percent.

EXAMPLE 5

The procedure of Example 3 was repeated employing eight grams of the propylene sulfide capped polybutadiene of Example 2, six grams of methyl methacrylate, 0.8 gram of azobisisobutyrolnitrile with 47 grams of ethylbenzene. The mixture was polymerized by heating to 60° C. for a period of 18 hours. A compression molded sample of the resultant polymer had a tensile strength at rupture of 1060 pounds per square inch and an ultimate elongation of 300 percent.

EXAMPLE 6

A block copolymer was prepared in the following manner. A dry toluene solution containing 0.26 gram of bis[4-(1-phenylethenyl)phenyl] ether in 20 milliliters of toluene was mixed with 1.5 milliequivalents of sec-butyllithium at room temperature for a period of 65 minutes. The reaction mixture was a toluene dispersion of oxydi-4,1-phenylene bis(3-methyl-1-phenylpentylidene)-bis(lithium). To the toluene dispersion was added 1.3 milliliters of isoprene and the mixture heated to 60° C. for a period of 5 minutes. The dispersion became a solution as the isoprene was added to the bislithium compound. The resulting solution of the solubilized bislithium compound was charged to a one-liter nitrogen purged flask which contained 450 milliliters of dry toluene having dissolved therein 40 grams of butadiene. The butadiene solution in the reaction flask was previously treated with 0.31 milliequivalent of sec-butyllithium for the purpose of removing active impurities such as oxygen and moisture which are known to interfere with the polymerization reaction. The charged one-liter flask was positioned in a water bath maintained at a temperature of about 55° for a period of about 90 minutes. At the end of the 90 minute period, polymerization was assumed complete. The one-liter flask and contents were placed in an ice bath for a period of about 10 minutes. At the end of this period of time, the temperature of the reaction mixture as determined by the use of a thermocouple in the flask was about 30° C. A one-half milliliter portion of purified propylene sulfide and a 2 millilter portion of purified tetrahydrofuran were added to the flask. Twenty minutes after the addition of the propylene sulfide and tetrahydrofuran, 0.12 milliliter of glacial acetic acid was added to the flask to terminate the active lithium sites. The reaction mixture contained a dimercaptan capped polybutadiene and the solution was maintained at about room temperature overnight. The following morning, 33 milliliters of styrene, 12.5 milliliters of acrylonitrile and 1.63 grams of azobisisobutyrolnitrile were added to the reaction mixture in the one-liter flask. The reaction mixture was then heated to 70° C. for a period of five hours with continuous stirring. At the end of this period, a polymeric product was separated from the reaction mixture, 57 grams of a thermoplastic elastomeric polymer was recovered. A portion of the polymer was molded and the tensile strength at break was determined to be 1124 pounds per square inch. The elongation at break was 460 percent. A compression molded film was analyzed employing infrared spectroscopy. The analysis indicated that the polymer contained about 16.7 weight percent styrene, 6.4 weight percent acrylonitrile, and about 76.9 percent butadiene.

In a manner similar to the foregoing illustrations, other block copolymers may be prepared in accordance with the present invention employing the hereinbefore delinated components to provide block polymers having a wide variety of physical properties.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A method for the preparation of a block copolymer, the step of the method comprising providing an anionically polymerizable monomer or mixtures thereof, polymerizing the monomer or mixture thereof anionically to provide polymer chains having at least one active or living end, contacting said polymer chains with a sulfur compound in a quantity at least sufficient to react with said polymer chain living ends, to thereby terminate the ends with a primary or secondary thiol group, the sulfur compound being selected from the group consisting of elemental sulfur and episulfides of the formula

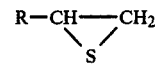

wherein R is hydrogen, alkyl contains 1 to 18 carbons and an aromatic group containing only carbon and hydrogen contacting the thiol terminated polymer chains with a free-radical polymerizable monomer and initiating free-radical polymerizable monomer to thereby provide a block copolymer comprising at least one anionically polymerized block and at least one free-radical initiated block.

2. The method of claim 1 wherein the monomer is polymerized anionically in the presence of an organic lithium polymerization initiating compound.

3. The method of claim 2 wherein the lithium compound is a polylithium compound.

4. The method of claim 3 wherein the lithium compound is dilithium compound.

5. A block copolymer of ABA configuration in which A represents a random copolymer of styrene and acrylonitrile and B is a diene elastomer block.

* * * * *